DATA STORAGE APPARATUS

Filed Dec. 31, 1951 8 Sheets-Sheet 1

INVENTORS
FRANCIS E. HAMILTON
GEORGE V. HAWKINS
ROBERT E. LAWHEAD, JR.
ERNEST S. HUGHES, JR.
BY Charles P. Boberg
ATTORNEY Nov. 13, 1956 F. E. HAMILTON ET AL 2,770,797

DATA STORAGE APPARATUS

Filed Dec. 31, 1951 8 Sheets-Sheet 2

INVENTORS
FRANCIS E. HAMILTON
GEORGE V. HAWKINS
ROBERT E. LAWHEAD, JR.
ERNEST S. HUGHES, JR.

BY Charles P. Boberg
ATTORNEY

DATA STORAGE APPARATUS

INVENTORS
FRANCIS E. HAMILTON
GEORGE V. HAWKINS
ROBERT E. LAWHEAD, JR.
ERNEST S. HUGHES, JR.
BY Charles P. Boberg
ATTORNEY INVENTORS
FRANCIS E. HAMILTON
GEORGE V. HAWKINS
ROBERT E. LAWHEAD, JR.
ERNEST S. HUGHES, JR.
BY Charles P. Boberg
ATTORNEY INVENTORS
FRANCIS E. HAMILTON
GEORGE V. HAWKINS
ROBERT E. LAWHEAD, JR.
ERNEST S. HUGHES, JR.
BY Charles P. Boberg
ATTORNEY INVENTORS
FRANCIS E. HAMILTON
GEORGE V. HAWKINS
ROBERT E. LAWHEAD, JR.
ERNEST S. HUGHES, JR.
BY Charles P. Boberg
ATTORNEY INVENTORS
FRANCIS E. HAMILTON
GEORGE V. HAWKINS
ROBERT E. LAWHEAD, JR.
ERNEST S. HUGHES, JR.
BY Charles P. Boberg
ATTORNEY INVENTORS
FRANCIS E. HAMILTON
GEORGE V. HAWKINS
ROBERT E. LAWHEAD, JR.
ERNEST S. HUGHES, JR.
BY Charles P. Boberg
ATTORNEY United States Patent Office 2,770,797 Patented Nov. 13, 1956

2,770,797

DATA STORAGE APPARATUS

Francis E. Hamilton, Binghamton, and George V. Hawkins, Robert E. Lawhead, Jr., and Ernest S. Hughes, Jr., Vestal, N. Y., assignors to International Business Machines Corporation, New York, N. Y., a corporation of New York Application December 31, 1951, Serial No. 264,304

3 Claims. (Cl. 340—174)

This invention relates to data storage apparatus, and particularly to shift controls for use in such apparatus to shift the positions of stored values.

In the operation of data processing systems utilizing data storage units, there is need frequently to shift a stored item of data relative to a given reference point. For example, assuming that the stored item consists of the number 00012, one may desire to shift the significant digits of this item one place to the left, giving a resultant value of 00120. Or one may want to shift the digits one place to the right (dropping the lowest-order digit) so that the result is 00001. Shifts of these types may be performed for a variety of purposes familiar to those skilled in the art. A shift may be performed, for instance, to change the effective position of a decimal point, to "round off" a numerical value, or to effect a multiplication or division (by 10). Moreover, in some systems it is the practice to read the digits of a numerical value serially out of the storage unit at a given reference point therein. For an assumed value of 00012, with digits being read successively from the left or highest-order end, successive shifts to the left would be made thus:

| | |
|---|---|
| Initial value | 00012 |
| First shift | 00120 |
| Second shift | 01200 |
| Third shift | 12000 |
| Fourth shift | 20000 |
| Fifth shift | 00000 |

until all of the digits in the original value have been read out of storage. A similar procedure could, of course, be employed if one wished to read the digits serially from the right or lowest-order end, with successive right shifts being performed in the process.

Recently there have been proposed several high-speed data processing systems in which rotating magnetic elements are employed for data storage purposes. Such elements usually are in the form of drums having magnetizable surfaces on which large quantities of data can be recorded magnetically. A great advantage of using a rotating magnetic drum as a storage element is that it enables data to be entered into and read out of storage at an extremely rapid rate. In other words, the "access time" is low. This makes the magnetic drum very useful in high-speed calculations and other data processing operations wherein items of data must be transferred with great rapidity and frequency between the storage unit and the instrumentalities which process the data.

Another useful feature of a magnetic drum storage unit is that it can be adapted to circulate or "revolve" the elements of a stored value cyclically through various locations on the drum surface. To illustrate this, suppose that a numeric value is recorded at a particular location on the drum surface and that it is desired to transfer such value to a second location on the drum surface, and from thence to a third location, and so on. To accomplish this, a reading head and a recording head are so arranged that when the reading head is reading the data at the first location, the recording head is effective to record data at the second location. Suitable data transfer circuits are arranged between the reading and recording heads to transfer data, with or without modification thereof, from the reading head to the recording head. The second location then is brought into cooperative relation with the reading head, while the third location is brought into cooperative relation with the recording head, and the data transfer operation is repeated. In this way the stored value is "revolved" a number of times for causing the value in question (or a value derived therefrom) to be transferred repeatedly from place to place on the surface of the drum.

An object of the present invention is to provide an improved data storage unit having novel shift control means adapted to utilize the principles of magnetic drum recording, as just described, for effecting the shifts which are required in the data processing operations referred to hereinabove.

Another object is to provide an improved data storage unit including a moving magnetic storage member in which the digits of a value are serially entered, read out and re-entered in successive cycles, to the end that digital shifts can be effected in a novel and expeditious manner, as desired, in the course of performing the readout and re-entry operations.

A further object is to provide an improved data storage unit having a rotating magnetic drum on which the digits of a value are recorded serially, together with serial reading and recording means for causing each value to be "revolved" around the drum from one location to another as the drum rotates, and including a novel shift control means for shifting the digits of a value relative to certain reference points on the drum as the value is revolved.

One of the features of the invention is the provision of a pair of alternate recording heads, one of which is used for normal recording operations, and the other of which is used when a particular type of shift operation is being effected. Another feature is the provision of a pair of alternate reading heads, one of which is used for normal reading operations, and the other of which is used when a particular type of shift operation is being performed. Each reading head and recording head is selectively switched in or out in accordance with the operation that is being performed.

Other objects of the invention will be pointed out in the following description and claims and illustrated in the accompanying drawings, which disclose, by way of examples, the principle of the invention and the best mode, which has been contemplated, of applying that principle.

Figs. 5A to 5E, inclusive, are diagrams illustrating a series of steps in a normal data transfer operation, which does not involve a shift.

Figures 5A, 5B:
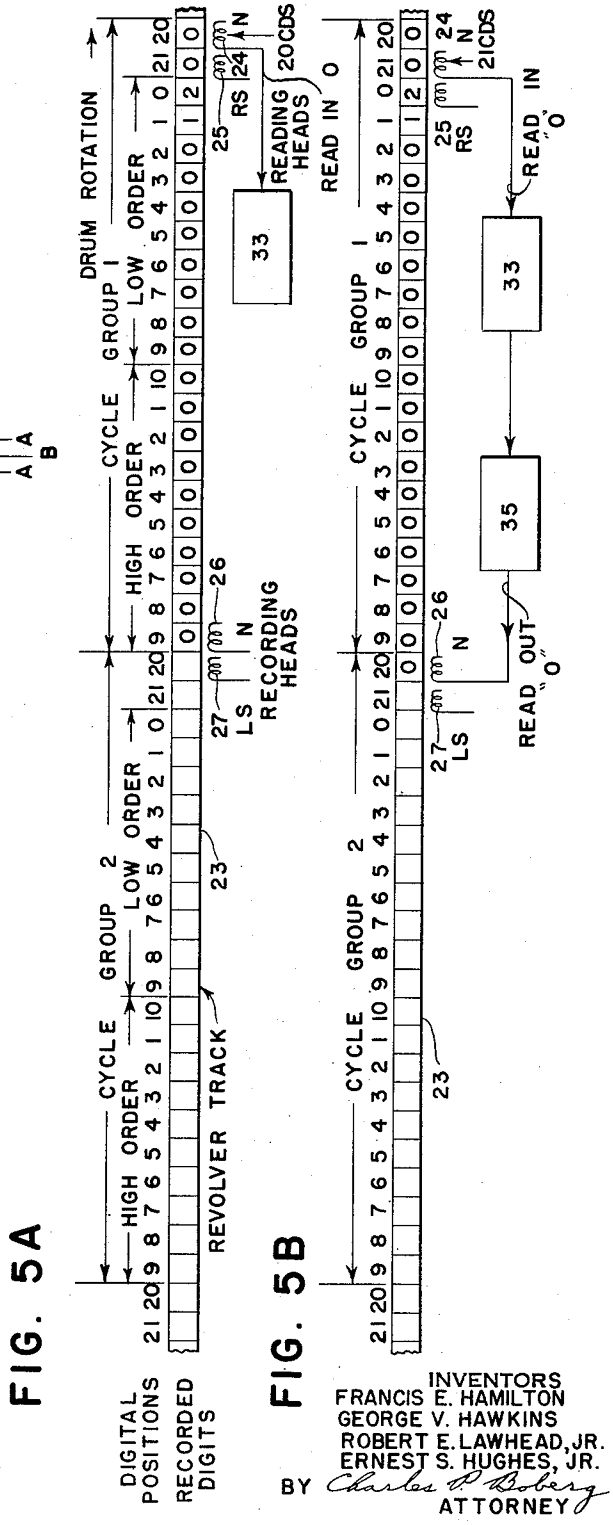
Figures 5C, 5D, 5E, 6A:
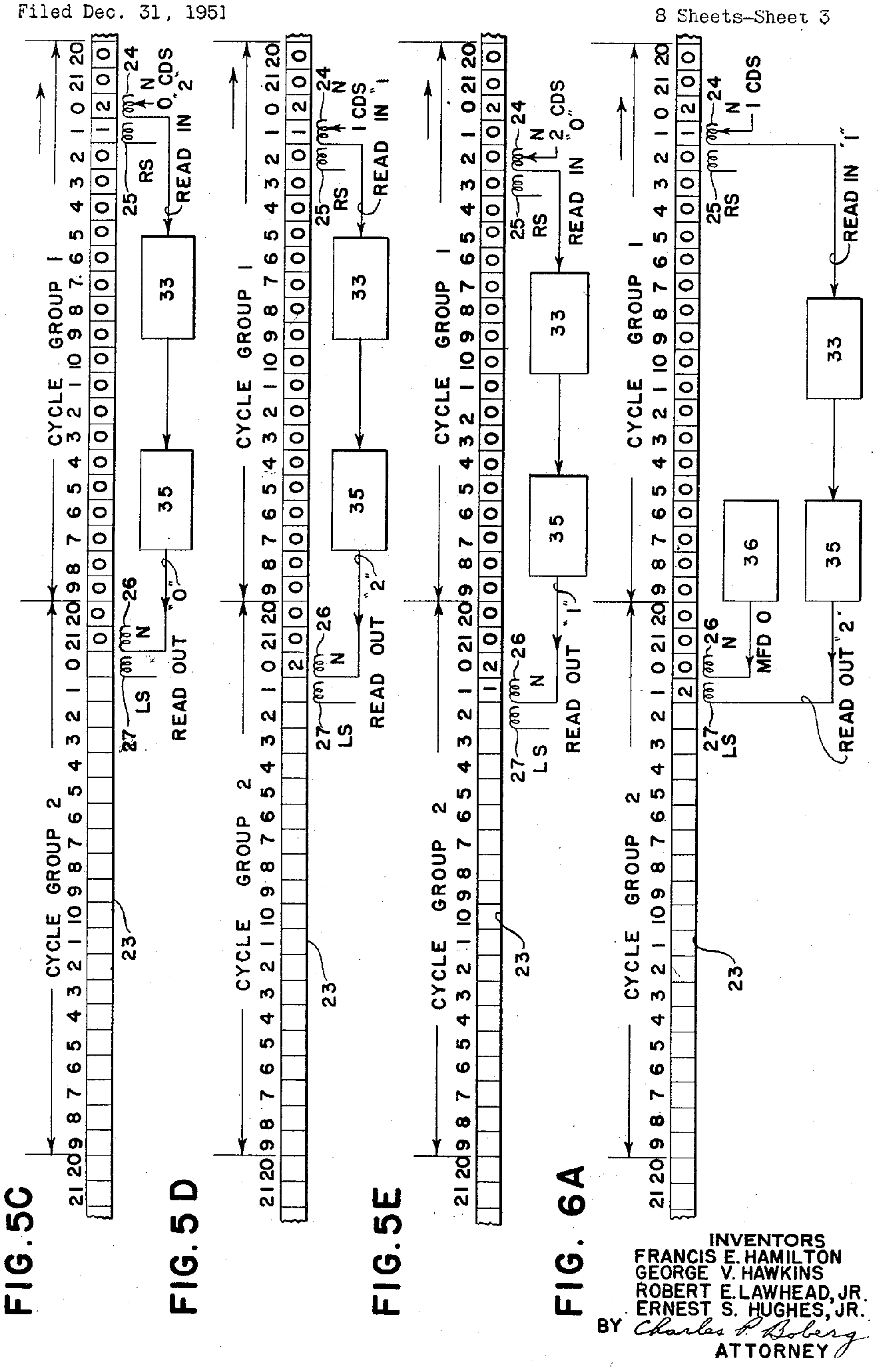
Figure 6B:
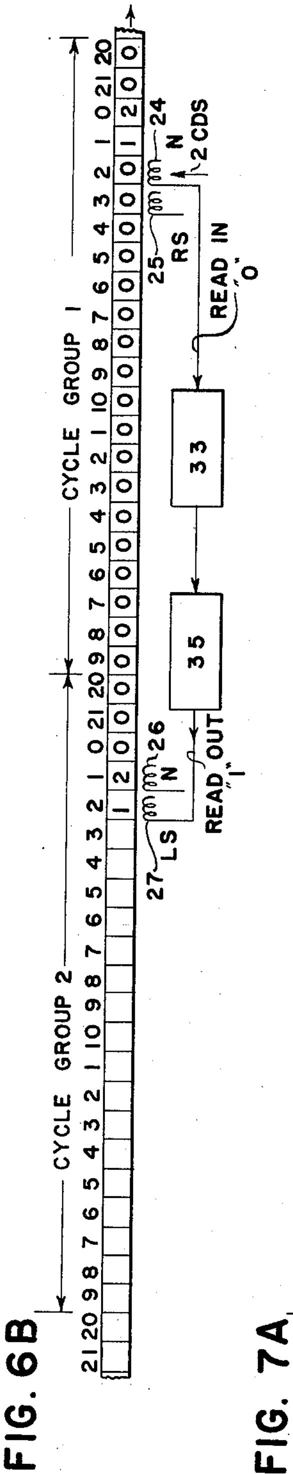

Figs. 6A and 6B are diagrams respectively illustrating two successive steps in a typical left-shift operation.

Figure 7A:
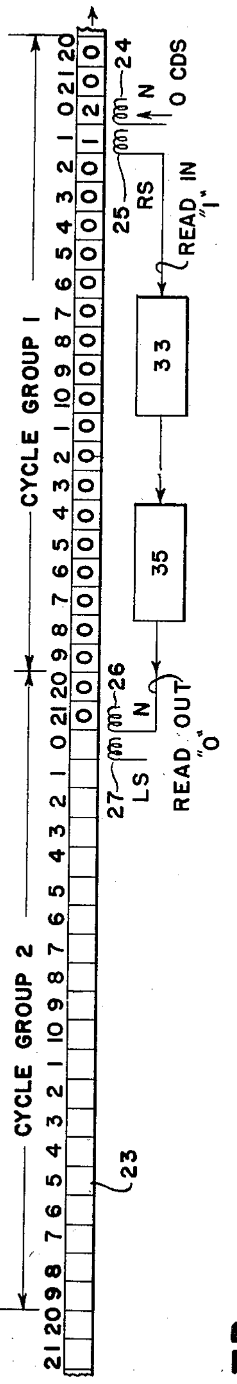
Figure 7B:
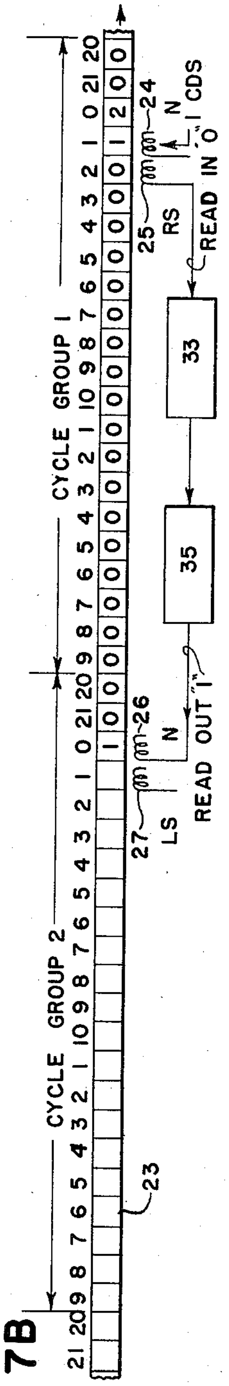
Figure 7C:
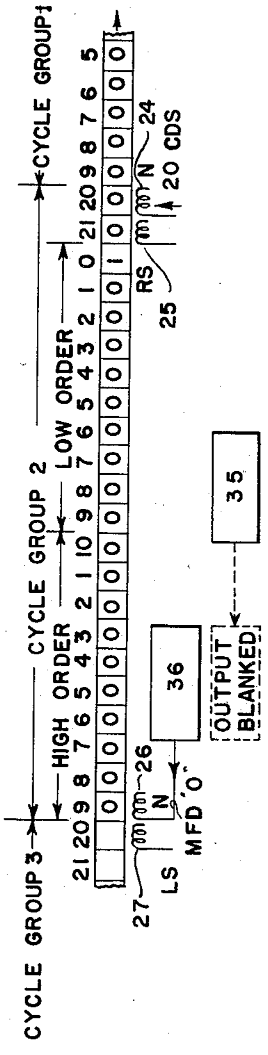

Figs. 7A, 7B and 7C are diagrams respectively illustrating certain steps in a typical right-shift operation.

Figure 1:
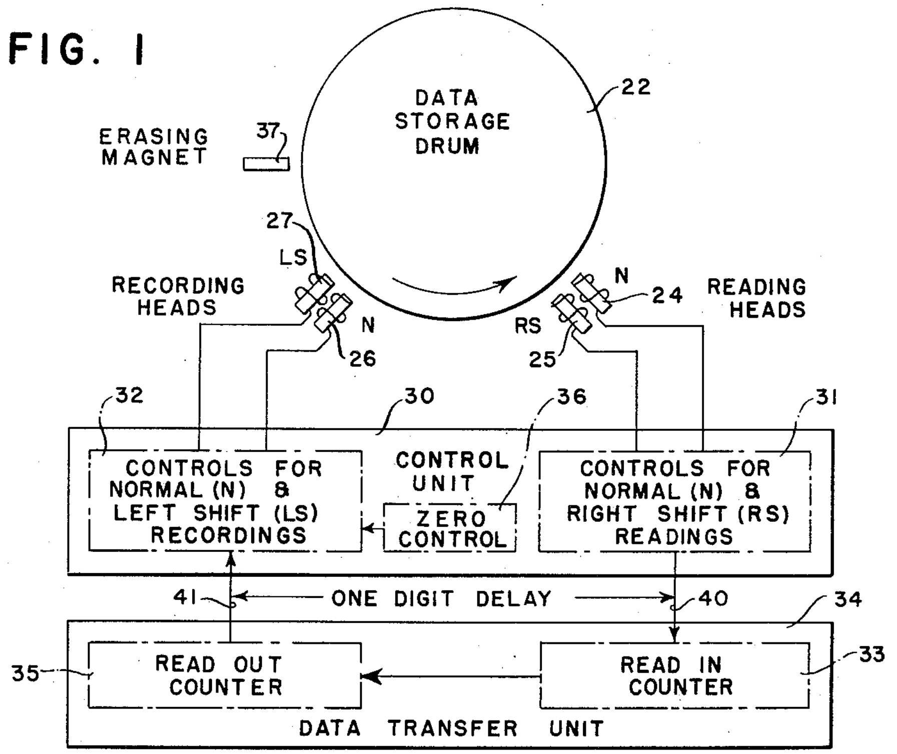
Fig. 1 is a simplified schematic view of a data processing system which employs a magnetic drum storage unit in accordance with the principles of the invention.

Figs, 8A and 8B together constitute a block diagram of the principal electronic circuits involved in the embodiment of the invention generally illustrated in Fig. 1.

Figure 8A:
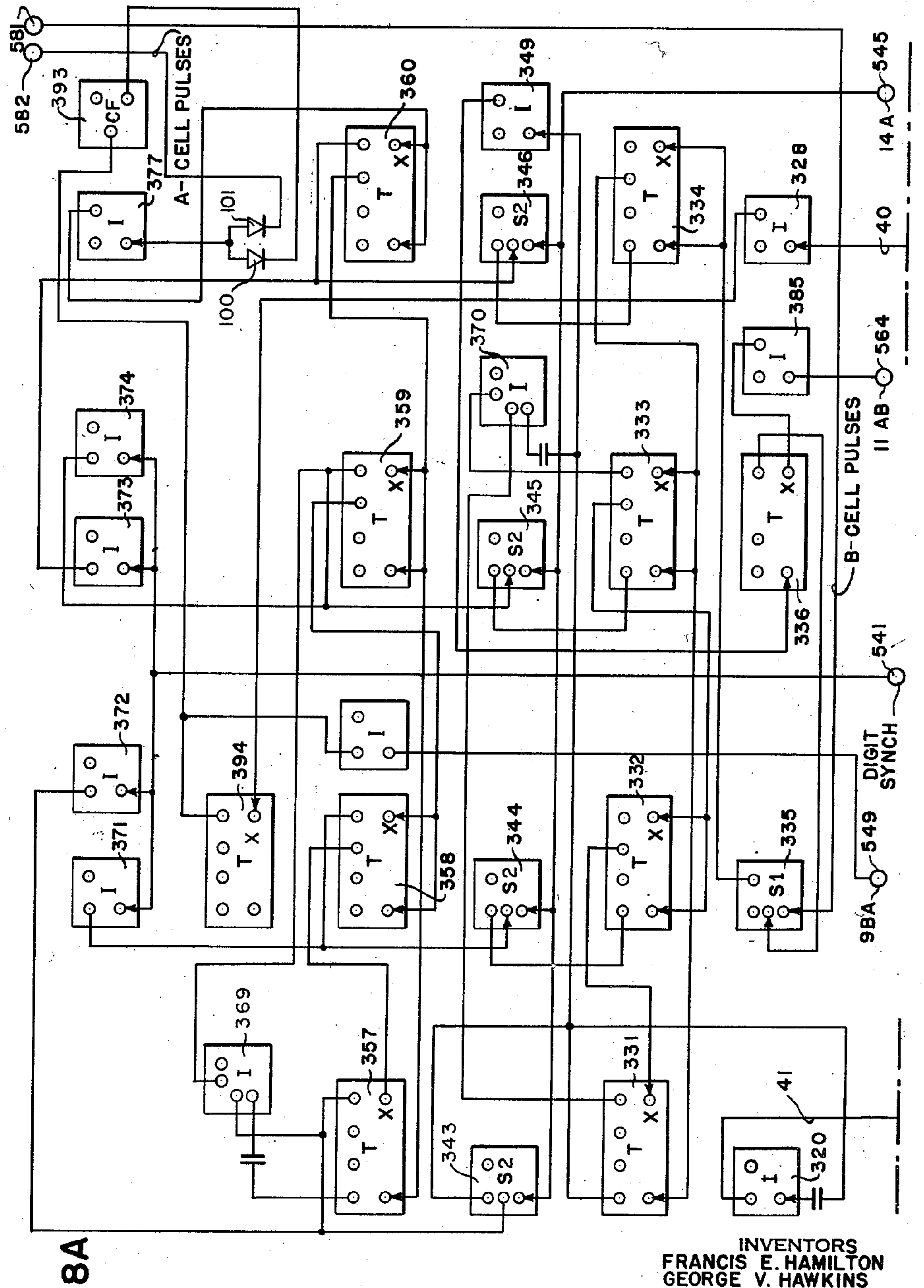
Figure 8B:
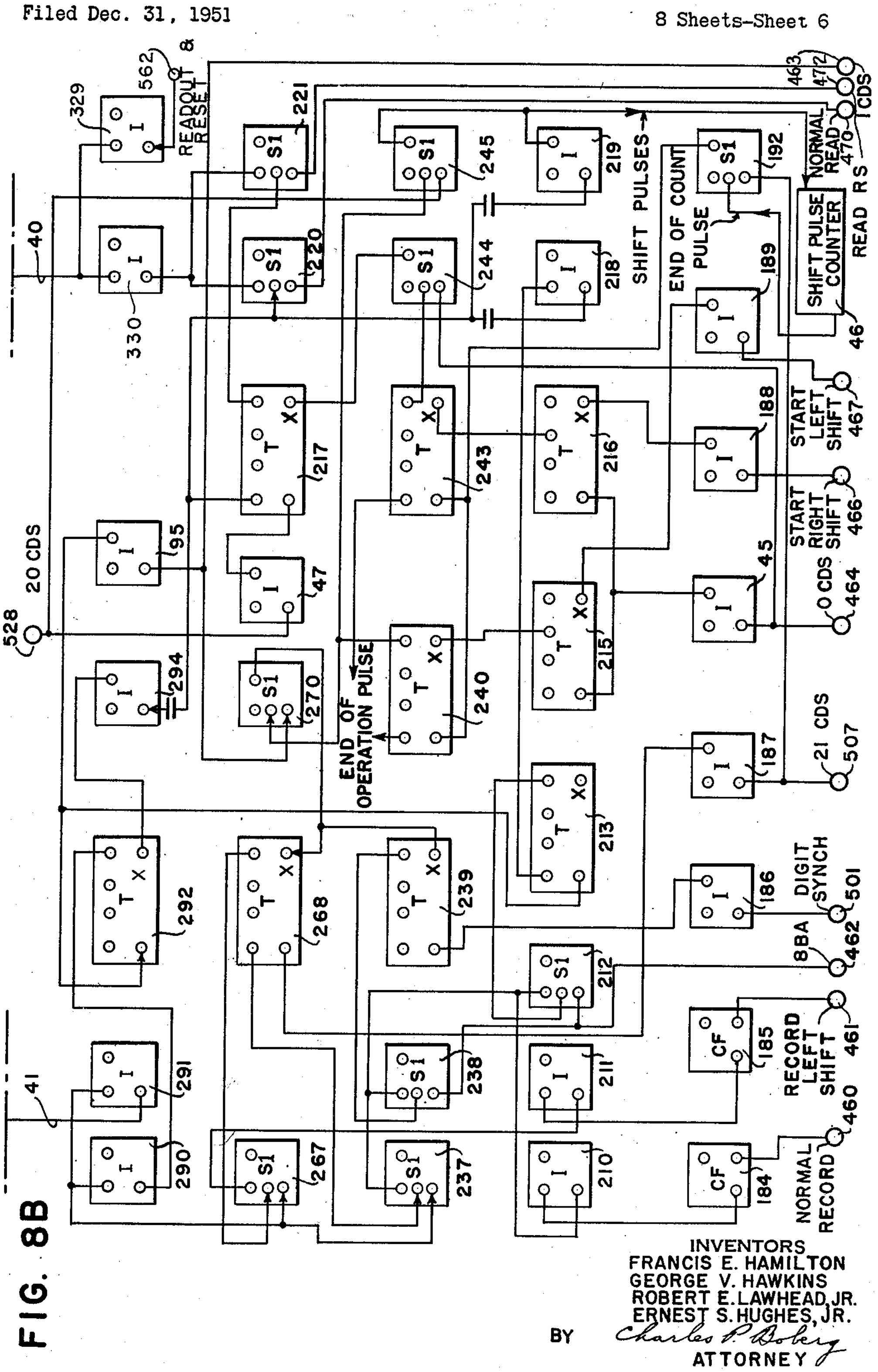

Figs. 9A to 13B are block and schematic illustrations of certain components used in the system of Figs. 8A and 8B.

Figure 14:
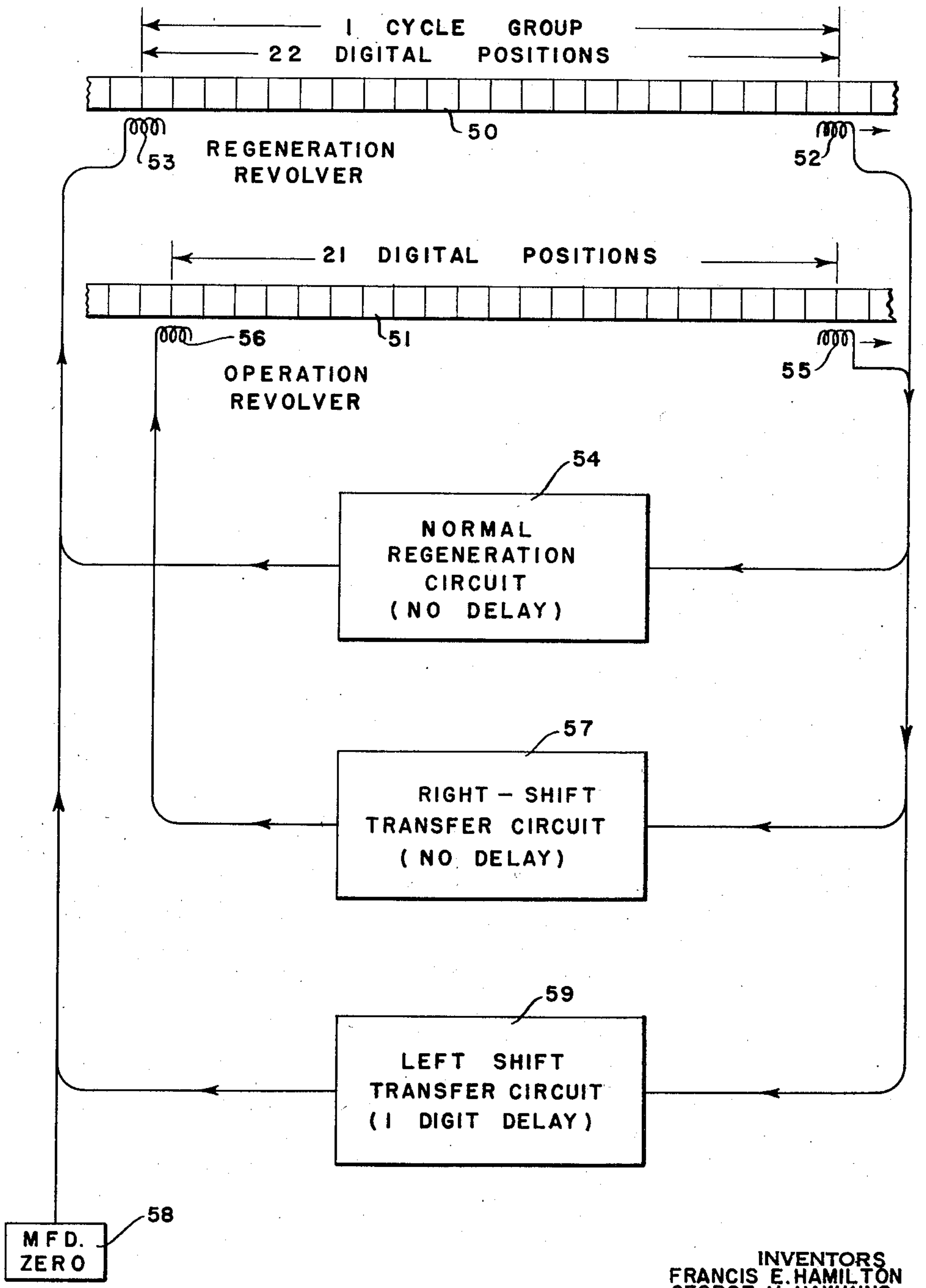

Fig. 14 is a schematic diagram showing a modified form of the invention.

Fig. 1 illustrates, in simple schematic form, an elementary data storage system which embodies several cardinal principles of the invention. This system utilizes a rotating data storage drum 22 (see also Fig. 2), the cylindrical surface of which is magnetizable so that data may be entered in the storage unit by selectively magnetizing the surface of the drum. Several ways of forming a magnetizable surface have been proposed. One is to wind magnetic wire on the drum and then machine the turns of wire down until the exposed surfaces thereof are flat. It has been proposed also to deposit a uniform coating of magnetic material on the surface of a smooth drum. The precise manner of forming the magnetizable surface is not material to the present invention.

Figure 2:
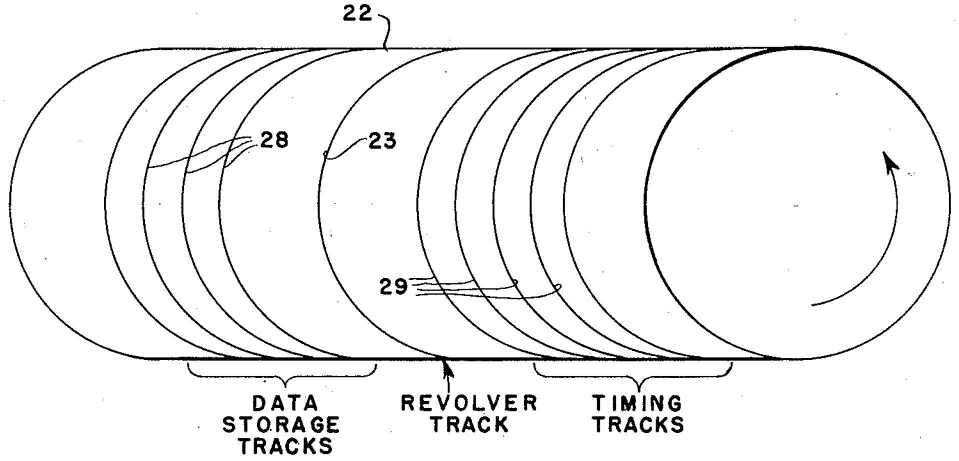
Fig. 2 is a partial perspective view of the magnetic drum, with the locations of certain timing and revolver tracks being indicated thereon.

Several recording tracks are defined on the surface of the drum 22, as indicated in Fig. 2. Among these is a "revolver" track 23, sometimes referred to as a "computer" track since it may be used in operations that involve computations such as addition, multiplication, subtraction and division. Associated with the revolver track 23, in the present embodiment of the invention, are a pair of reading heads 24 and 25 (Figs. 1 and 3), and a pair of recording heads 26 and 27, the arrangement and respective purposes of which will be described presently.

Other recording tracks defined on the drum 22 may include data storage tracks 28 (Fig. 2) and timing tracks 29. The data storage tracks 28 are utilized for what may be considered "permanent" data, in the sense that the data elements are not revolved or otherwise subjected to change while the data processing operations are in progress. It should be understood, of course, that any of the data recorded on the drum can be deleted or erased therefrom by well-known methods when so desired. On the timing tracks 29 are recorded various timing marks or indicia which time the various operations that take place within the data processing system, as will be brought out in the following description.

The foregoing describes in a very general way the layout of recording tracks on the drum 22. The means for driving the drum 22 is not illustrated, but the provision of such a drive mechanism would be well within the province of persons skilled in the art. In the form of the invention herein shown, the items of data are assumed to be recorded "serially" on the drum, that is to say, the various digits or characters in each item are recorded sequentially along an arc of a recording track. Several items may be recorded in a single track, these items being located in series around the track. It is possible also to record the items in "parallel," with the digits or characters of each item being disposed respectively in adjoining tracks so that the recorded item extends axially rather than circumferetially along the drum surface.

Figure 3:
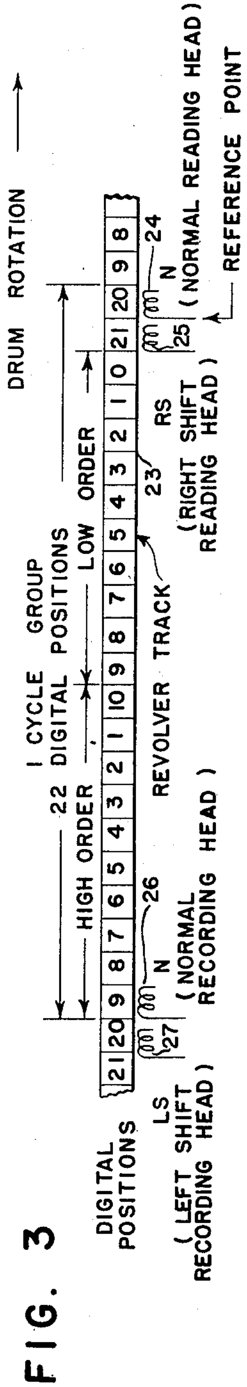
Fig. 3 is a diagram which shows the reading and recording heads in cooperation with a portion of the revolver track, and identifying the digital positions in a "cycle group."

In the following description particular attention will be given to the revolver track 23 (Figs. 2 and 3). The track 23 is defined by a series of digital positions or magnetizable elements at which digits or other characters may be respectively recorded. Items of data may be recorded serially upon the revolver track 23 by suitable magnetic recording means of known construction. In the data processing system to which the illustrated embodiment of the invention specifically pertains, it is found convenient to divide the revolver track into a plurality of "cycle groups," each comprising 22 digital positions. The layout of a typical cycle group is indicated in Fig. 3. The group is broken down into a set of ten "low order" positions numbered 0 to 9, respectively, a set of ten "high order" position numbered 10 and 1 to 9, respectively, in the order named, and two additional positions, 20 and 21.

A value not exceeding 10 digits in length may be recorded in each of the low order and high order sets. The positions 20 and 21 are reserved for control purposes. The beginning of each cycle group is regarded as a reference position on the track 23 for determining, by its location relative thereto, the denominational significance of each digit recorded within the group.

Figure 4:
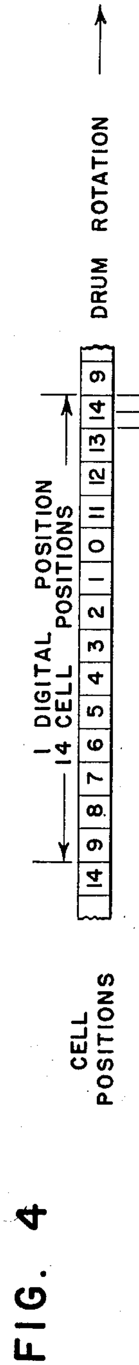
Fig. 4 is a diagram showing the layout of "cell positions" in a digital position, according to a 14-unit code.

Referring now to Fig. 4, each digital position is subdivided into a series of what may be termed "cell" positions or "bits." For the present it will be assumed that a 14-bit code is employed, whereby a digit or other character may be represented by selectively magnetizing the 14 discrete areas or cells that make up the digital position. Digits are represented by magnetizing the 0–9 cells, while alphabetic characters and other symbols would utilize the additional four cells. Inasmuch as the techniques of magnetic recording for the representation of digits and other symbols are well known in the art, no detailed explanation of the same will be given herein.

Occasionally hereinafter it may be necessary to consider a still further subdivision of the cell positions (Fig. 4) into "A" and "B" points. The A point is at the dividing line between adjacent cells, while the B point occurs in the middle of the cell. "AB" may refer to the half of the cell which is sensed first, and "BA" to the half of the cell which is sensed last during reading.

While a 14-bit code is employed for representing digits in the present instance, other codes have been proposed and are being adopted for this purpose. One of these is a 7-bit code, referred to hereinafter, which contemplates the use of only 7 cell positions per digital position. The use of this code doubles the storage capacity of the drum, although it involves a somewhat more complicated arrangement of reading and recording instrumentalities than that indicated in Figs. 1 and 3, because of space limitations. For the present, therefore, it will be assumed that the 14-bit code is employed, making it possible to use the relatively simple arrangement of reading and recording heads indicated in Figs. 1 and 3.

It should be noted also that the bits can be arranged in parallel rather than in series on the drum, if so desired. This is practicable only if a code using a small number of bits is employed. When parallel-bit representation is employed, multi-track rather than single-track reading and recording devices must be used.

As explained previously, the revolver track 23 (Figs. 2 and 3) on the surface of the data storage drum 22 (Figs. 1 and 2) is associated with a pair of stationary reading heads 24 and 25 and a pair of stationary recording heads 26 and 27. The normal (N) reading head 24 is located one digital position beyond the right-shift (RS) reading head 25, in the direction of drum rotation. That is to say, each digital position on the revolver track 23 will first pass the "RS" reading head 25 and then, one digital position later, it passes the "N" reading head 24. The normal (N) recording head 26 is located 21 digital positions prior to the "N" reading head 24, with respect to the direction of drum rotation, and the left-shift (LS) recording head 27 is located one digital position prior to the "N" recording head 26, or 22 digital positions prior to the "N" reading head 24. (It will be recalled that there are 22 digital positions in each cycle group.)

Data picked up by either of the reading heads 24 and 25 in any of the cycle groups may be recorded, with or without modification, by either of the recording heads 26 and 27 in the next succeeding cycle group on the revolver track 23. Then, when the second cycle group reaches the reading heads 24 and 25, data may be transferred therefrom to the following cycle group through the recording head 26 or 27. The combination of elements for effecting the successive transfer of data from one cycle group to another is commonly referred to as a "revolver," in the parlance of the art.

As indicated briefly in Fig. 1, the revolver includes a control unit 30 having control circuits indicated by the rectangle 31 to determine which of the reading heads 24 and 25 shall be effective, and control circuits indicated by the rectangle 32 for determining which of the recording heads 26 and 27 shall be effective. Data picked up by the selected reading head passes through the circuits 31 to a readin counter 33 in a data transfer unit 34. Such data then is transferred from the counter 33 to a readout counter 35 in the unit 34, from which it passes through the circuits 32 to the appropriate recording head. During the interval which elapses between reading the data into the counter 33 and reading data out of the counter 35, the data storage drum 22 will have advanced one digital position, thereby inserting a one-digit delay in the revolver operation. The significance of this will become more apparent as the description proceeds. Also included in the control unit 30 is a zero control circuit 36 (Fig. 1) which "manufactures" zeros to be recorded on the drum 22 under certain conditions, as will be fully explained.

Information which is recorded on the drum 22 by the recording heads 26 and 27 remains on the drum until it passes by an erasing magnet 37 (Fig. 1) which alters the state of magnetization of the drum surface in a well-known manner to delete the information magnetically recorded thereon by the recording heads 26 and 27. The erasing magnet 37 is located slightly in advance of the recording heads 26 and 27 so as to clear the track for the reception of new data.

Brief functional descriptions of the system shown in Fig. 1, under various assumed conditions of operation, are presented below. For convenience, a stationary reference point is assumed at the normal reading head 24, as indicated in Fig. 3. Each operation may be divided into a number of steps or phases corresponding to the digital positions on the track 23 as they successively move into cooperation with the reading head 24. Various timing pulses, known technically as "cycle digit synch pulses," are emitted from one of the timing tracks 29 (Fig. 2) in synchronism with the movement of digital positions past the reference point (Fig. 3). These "cycle digit synch" (hereinafter referred to as "CDS") pulses may be used to time the operations of various elements in the control unit 30 (Fig. 1). The times at which the CDS pulses are emitted correspond respectively to the times at which the various digital positions reach the reference point. For example, the revolver track 23 will attain the position shown in Fig. 3 at the 20 CDS time, or for brevity, at 20 CDS. This may further be qualified by specifying the cycle group, such as, cycle group 1–20 CDS. Additional qualifications may be added where applicable, such as, "high order," "low order" and the various cell positions within each digital position. Thus, one might go to the extent of defining a particular instant of time as cycle group 1, low order 1 CDS–13A, meaning the low order 1 digital position in cycle group 1, cell position 13A.

*Normal revolver operation—Figs. 5A to 5E*

During normal revolver operation, digital values are picked up by the normal reading head 24 and are recorded by the normal recording head 26. By way of example, it is assumed herein that the value "12" is recorded in the low order 1 and 0 digital positions in cycle group 1. This value is to be transferred without change to cycle group 2 as the initial step in the normal revolver operation. That is to say, it is desired to record the value "12" in the low order 1 and 0 digital positions of cycle group 2.

As a part of the preliminary recording operation, during which time the digits 1 and 2 are recorded respectively in the low order 1 and 0 digital positions of cycle group 1, zeros are recorded in all of the other digital positions in this cycle group. It will be recalled that just before the various digital positions travel past the recording heads, they are subjected to the action of an erasing magnet 37 (Fig. 1) which leaves the track in a blank or clear condition. It is desirable, however, that zeros be recorded in those digital positions that do not contain significant digits or other characters, before these digital positions reach the reading heads. Hence, as indicated in Fig. 5A, all of the digital positions in cycle group 1, except the low order 1 and 0 positions, have zeros recorded therein before these positions arrive at the reading heads.

As cycle group 1 comes into cooperation with the reading heads, the digital position 20 therein moves past the aforesaid reference point, this occurring at 20 CDS as indicated in Fig. 5A. Following this, the digital position 21 moves past the reference point, at 21 CDS as indicated in Fig. 5B. The digital positions 20 and 21 are utilized for special control purposes which need not be considered at the present time. During 20 CDS, a "0" is read from digital position 20 into the readin counter 33. During 21 CDS this 0 is transferred to the readout counter 35, which causes the normal recording head 26 to record a 0 in cycle group 2 digital position 20 (Fig. 5B). Meanwhile the normal reading head 24 reads a 0 from cycle group 1 digital position 21 to the readin counter 33. This reading, in turn, is transferred to the readout counter 35 and is recorded by the normal recording head 26 in cycle group 2 digital position 21 during the 0 CDS time.

At 0 CDS the digit "2" is read from the 0 digital position in cycle group 1, and this value is entered into the readin counter 33, as indicated in Fig. 5C. The digit 2 then is transferred to the readout counter 35, from which it is read out to the normal recording head 26 during the 1 CDS time (Fig. 5D). At this time the normal reading head 24 is reading the digit 1 in the low order 1 digital position in cycle group 1, as indicated in Fig. 5D. The 0 digital position in cycle group 2 is positioned to receive the digit 2, which is recorded therein by the normal head 26.

At 2 CDS (Fig. 5E) the digit 1 is read out from the counter 35 and is recorded by the head 26 in the low order 1 digital position of cycle group 2. Meanwhile, the "0" recorded in the low order 2 position of cycle group 1 is picked up by the reading head 24, and the corresponding value is entered into the counter 33.

As a result of the foregoing operations, the value "12" recorded in cycle group 1, positions 1 and 0, is now also recorded in cycle group 2, where it occupies the corresponding 1 and 0 digital positions. The zeros recorded in the various digital positions of cycle group 1 likewise are recorded in the corresponding digital positions of cycle group 2.

Subsequently, when the value "12" recorded in cycle group 2 is read by the reading head 24, the above-described process is repeated to bring about the recording of said value in cycle group 3, which follows cycle group 2. Generally speaking, the recorded zeros in each cycle group are transferred to the next succeeding cycle group in similar fashion. However, under certain conditions which will be explained subsequently, zeros may be "manufactured" by the special zero control circuit 36 (Fig. 1) and inserted in selected digital positions.

The normal revolver operation just described may be repeated indefinitely, if desired, or it may be altered at any stage. In the absence of other instructions from the control unit of the machine, normal revolver operation will take place until such time as a new instruction, such as a left-shift or a right-shift, is issued by the command section of the machine.

*Left-shift operation—Figs. 6A and 6B*

Referring to the example described above under the heading "Normal revolver operation," an instance may arise in which it is desired that the value recorded in a particular cycle group be shifted one digital position to the left and recorded in the subsequent cycle group in the shifted relationship. To accomplish this, the LS recording head 27, rather than the N recording head 26, is utilized for transferring digits from one cycle group to another. In describing this process, it may be assumed that the revolver operation has progressed through the stages respectively depicted in Figs. 5A, 5B and 5C. The digit 2 in the 0 position of cycle group 1 has been read and entered into the counter 33, as shown in Fig. 5C.

At 1 CDS time the digit 2, which meanwhile has been transferred to the readout counter 35, is recorded in cycle group 2 (Fig. 6A) through the left-shift recording head 27. By comparing the step shown in Fig. 6A with that shown in Fig. 5D, it will be noted that the digit 2 now occupies the digital position 1, low order, in cycle group 2 (Fig. 6A), whereas it normally would have been recorded in position 0 (Fig. 5D). In order that the 0 digital position in cycle group 2 will not be left blank, a zero is "manufactured" by the zero control circuit 36 (Fig. 6A) and is recorded through the normal head 26 in said 0 position, this occurring at 1 CDS time.

During 2 CDS (Fig. 6B) the digit 1 from the low order 1 digital position in cycle group 1 is read out from the counter 35 and is recorded in the low order 2 digital position in cycle group 2, through the LS recording head 27. Zeros are transferred and recorded in the remaining digital positions.

From this point on, arrangements may be made to drop the digit which is read from the high order 9 digital position of each group, as successive left-shift operations are performed. Alternatively, the digit in question may be employed for the purpose of signalling whether or not it is significant, or what its value is, before a recording is made in the next cycle group. It should be noted also that for each left shift performed, the quantity so shifted is, in effect, multiplied by 10.

*Right-shift operation—Figs. 7A, 7B, 7C*

In this example it is assumed that the value "12" is recorded in the low order 1 and 0 digital positions of cycle group 1, and that a right shift is to be performed, thereby placing the digit "1" in the 0 position of cycle group 2 and dropping the digit "2." The preliminary phases shown in Figs. 5A and 5B are performed, and at 0 CDS time the revolver track 23 arrives in the position represented in Fig. 7A. Here, instead of reading data from the track through the normal reading head 24, the right-shift reading head 25 is rendered active so that the digit "1" from the low order 1 digital position of cycle group 1 is entered into the counter 33. The digit "2" in the 0 digital position of cycle group 1 is skipped in reading.

At 1 CDS (Fig. 7B) the digit "1" is read out from the counter 35 and is recorded through the normal recording head 26 in the 0 digital position of cycle group 2. Thus, the value "12" recorded in cycle group 1 has now, by a right-shift operation, become the value "1" in cycle group 2. The zeros in the remaining digital positions (low order 2, and so forth) of cycle group 1 are read by the RS reading head 25 and are recorded in cycle group 2 (wherein they are displaced one digital position to the right) by the N recording head 26. Thus, in due course, the zero in the high order 9 digital position of cycle group 1 is read out, and a corresponding zero is recorded during 9 CDS time in the high order 8 digital position of cycle group 2.

During the period when the digital positions 20 and 21 of cycle group 2 are passing by the reading heads, following the right shift just described, the output of the readout counter 35 is blanked, as indicated in Fig. 7C. This would result in the high order 9 digital position of cycle group 2 being left blank, if no alternative provision were made to record a zero therein. In the present case this situation is met by manufacturing a zero in the control circuit 36 (Fig. 7C) and recording such zero in the high order 9 digital position of cycle group 2, during 20 CDS time. This step is repeated during 21 CDS and 0 CDS to record zeros in the 20 and 21 positions of cycle group 3, instead of reverting to the usual revolver procedure, so as to avoid unnecessary switching. For each right shift which is performed, the quantity so shifted is, in effect, divided by 10.

*Details of system—Figs. 8A to 12B*

Figs. 8A and 8B are block diagrams of certain electronic circuits which are involved in the control unit 30 and data transfer unit 34 (Fig. 1). Fig. 8A relates to the data transfer unit 34, while Fig. 8B relates to the control unit 30. When these two diagrams are joined together, it will be seen that the conductors 40 and 41 extending between them correspond respectively to the conductors indicated at 40 and 41 in Fig. 1. The rectangles containing the letters T, I, S, and CF in Figs. 8A and 8B respectively represent triggers, inverters, switches, and cathode followers. These symbols are shown in Figs. 9A, 10A, 11A, 12A and 13A opposite the corresponding tube circuit diagrams 9B, 10B, 11B, 12B and 13B. The latter diagrams are intended only to represent typical circuits that may be employed, and it should be understood that minor variations may readily be made in these circuits by those skilled in the art to insure the successful operation of the system as a whole.

The trigger unit T (Fig. 9A) has two stable states and is adapted to be triggered back and forth between these two states in response to negative input pulses which are applied to the grids of the tubes A and B through the input terminals shown. Normally the trigger T is in such a state that the tube B is conducting while the tube A is nonconductive. This is indicated by a small "*x*" placed alongside the "B" input terminal in Fig. 9A. In this condition the trigger T may be said to be "off." When a negative pulse is applied to this terminal, the circuit assumes its other stable condition wherein the tube B is nonconductive and the tube A is conducting. In this condition the trigger T may be considered as being "on." Any further negative pulses impressed upon the "B" input terminal at this time will have no effect inasmuch as the tube B is already nonconductive. However, the first negative pulse that is applied to the "A" input terminal will flip the circuit back to its original state in which tube A is nonconductive and tube B conducts. Under some circumstances (for example, in pulse-counting operations) the two input terminals may be connected to a single line so that successive negative pulses coming through that line will trigger the circuit back and forth as just described.

Figure 9A:
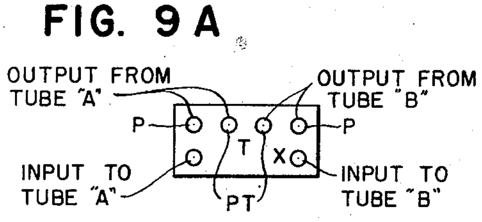
Figure 9B:
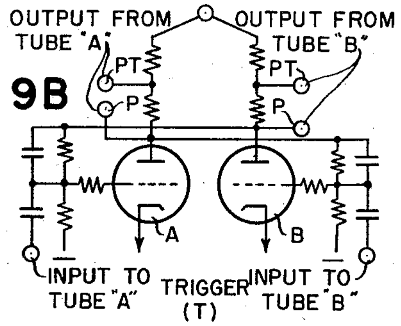

Each of the trigger tubes A and B (Fig. 9B) has plate output terminals designated P, and it also has plate taps PT from which which the output may be taken under certain conditions. Fig. 9A indicates the positions of the output terminals P and PT within the block representation of a trigger circuit. Although the tubes A and B are represented in Fig. 9B as having separate envelopes, it is common practice to place these tubes in a single envelope. Hence the terms "tube A" and "tube B" should be construed herein as applying to the A and B sections of the trigger T (or the left-hand and right-hand sections, respectively, as viewed in Figs. 9A and 9B), rather than being limited to tubes which have separate envelopes.

Figure 10A:
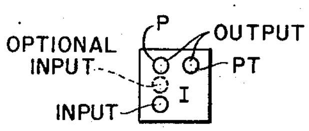
Figure 10B:
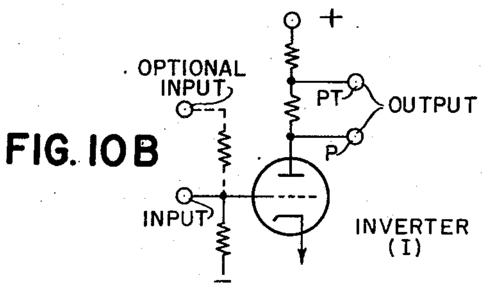
Figure 11A:
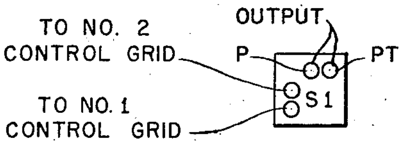
Figure 11B:
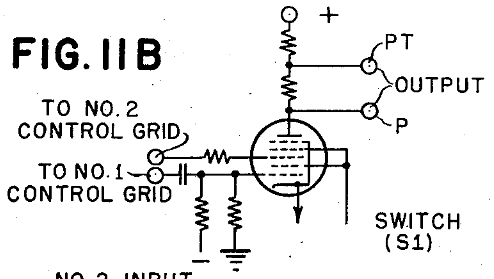
Figure 12A:
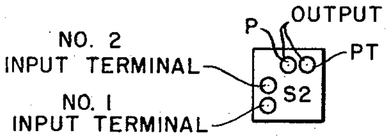
Figure 12B:
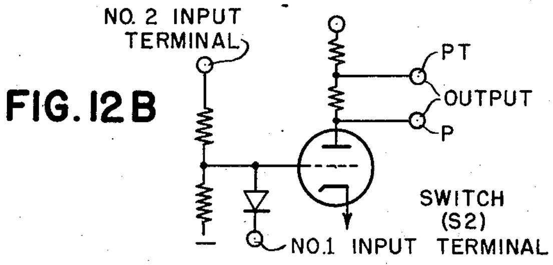
Figure 13A:
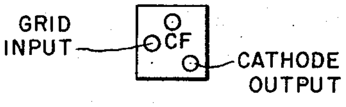
Figure 13B:
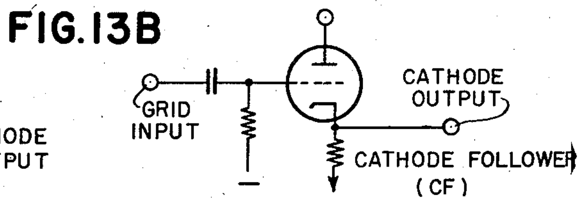

The circuit for the inverter I (Fig. 10A) is represented in Fig. 10B. An input pulse of one polarity applied to the inverter produces an output pulse of the reverse polarity. The output terminals of the inverter comprise the plate electrode P and the plate tap PT. The optional input terminal is used when the inverter is employed as a block tube for a counter, as described hereinafter.

The two types of switches, S1 (Figs. 11A and 11B) and S2 (Figs. 12A and 12B), are positive coincidence switches. In each case the switch is rendered conductive when positive input pulses of the required magnitude are applied simultaneously to the No. 1 and No. 2 input terminals. The illustrated system also utilizes a type of negative coincidence switch comprising a pair of inverters, such as 329 and 330 (Fig. 8B), which are arranged to pass pulses only when there is a coincidence of negative input voltages. The functions of these various switches will be brought out more fully in connection with the description of circuits shown in Figs. 8A and 8B.

The cathode follower CF (Figs. 13A and 13B) is of conventional design and has the well-known property of providing a low-impedance output which is of the same polarity as the input. It is employed herein for transferring signals from the electronic circuits to the recording heads of the machine, with a minimum of interference due to stray pickup.

Referring again to Figs. 8A and 8B, the operation of the system illustrated therein will be described first in connection with a normal read function, and then as to left-shift and right-shift functions. The sources of the timing and program control pulses, which are fed at predetermined times to various terminals represented in these views, are not specifically shown herein since they are only incidental to the present invention. Briefly, it may be stated that the timing tracks 29 (Fig. 2) on the drum 22 have magnetically recorded spots thereon for initiating the timing pulses through suitable pickup means at the appropriate times during the operation of the system, such practice being familiar to those skilled in the art. Similarly, the data storage tracks 28 may contain a stored program which determines when various functions of the system shall be performed, this, too, being familiar practice. It should be noted further that the illustrated system is but typical of numerous equivalent arrangements that may be employed to accomplish the results herein described.

*Normal read—Figs. 8A and 8B*

The normal read terminal 470 (Fig. 8B) is coupled to the normal reading head 24 (Fig. 1). Positive pulses picked up by the normal reading head 24 pass through the terminal 470 and are impressed upon the No. 1 control grid of a switch 220 (Fig. 8B). At the same time pulses will be picked up by the right-shift reading head 25 (Fig. 1) and passed through the right-shift read terminal 472 (Fig. 8B) to be impressed upon the No. 1 control grid of the switch 221. The No. 2 control grids of the switches 220 and 221 are biased respectively by the A and B outputs of a trigger 217 which controls normal and right-shift operations according to whether it is in its "on" or "off" condition. Normally, the trigger 217 so biases the switches 220 and 221 that only the switch 220 can pass pulses. Hence, the right-shift reading head is ineffective in the present instance.

The pulses which are passed by the switch 220 (now of negative polarity) are fed through an inverter 330 to a conductor 40 (Figs. 8A and 8B) leading to an inverter 328. The inverter 330 is part of a negative coincidence switch comprising the inverters 329 and 330. This switch 329—330 is operative only when negative input pulses are applied to both of the inverters 329 and 330. During all "read" operations a negative gate on the terminal 562 is applied to the inverter 329. Hence, the switch 329—330 is conditioned so that the negative pulses applied to the inverter 330 are passed (in the form of positive pulses) to the conductor 40. During the initial reset operation of the machine, however, the negative gate is removed from the terminal 562, and the switch 329—330 then will suppress any input pulses from the switches 220 and 221 to the inverter 330. Under these conditions, zeros are recorded on the drum.

For each digit read from the storage drum, there is a differentially timed pulse through the conductor 40 (Figs. 8A and 8B) to the inverter 328 (Fig. 8A). The negative pulse output of the inverter 328 is fed to the B input terminal of a trigger 394, turning this trigger "on." The trigger 329 is held in its "on" condition until the last of the cells in the 0–9 series (Fig. 4) has passed the reading head, at which time a positive pulse is applied to a terminal 549 (Fig. 8A). This is changed to a negative pulse by the inverter 396 and is applied to the plate of tube B in the trigger 394, causing the trigger 394 to be turned "off."

The plate output of tube 394B is impressed upon the input terminal of a cathode follower 393. The positive output of the follower 393 is applied to a diode 100, which is included in a positive coincidence switch comprising the diodes 100 and 101. Positive A-cell pulses, appearing at the "A" times, are impressed upon the terminal 582 (Fig. 8A), and these A-cell pulses are applied to the diode 101. Depending upon the time at which the trigger 394 is turned "on," thereby conditioning the coincidence switch 100—101, a measured number of these A-cell pulses will be passed by the switch 100—101. These positive pulses are passed through the inverter 377 and are applied as negative pulses to the input terminals of a trigger 360, which is a part of the readin counter comprising triggers 357 to 360 (Fig. 8A) and the inverter 369, which serves as a block stage.

In the present system it is preferred to record digits in a complementary form on the drum. Thus, the digit "2" would be recorded on the drum as "7," which is the 9's complement of "2." Hence, for the digit "2," the trigger 394 would be turned on at the 7-cell time, enabling two A-cell pulses to be fed through the switch 393 to the trigger 360 of the readin counter. The first pulse turns the trigger 360 "on," rendering it conductive on its "A" or left-hand side as viewed in Fig. 8A. The second pulse turns the trigger 360 "off." In being turned "off," the trigger 360 sends a negative pulse to the trigger 359, which turns it "on." The digit "2" is therefore registered by the trigger 359, which now is conductive on its "A" side, the trigger 360 meanwhile having been turned "off" so that it is conductive on its "B" side.

At the low order 1CDS–14A position in the cycle, a positive pulse at terminal 545 (Fig. 8A) is applied to the No. 1 input terminals of the transfer switches 343, 344, 345 and 346. In the present instance the trigger 359 is in such a condition that the No. 2 input terminal of the switch 345 is biased to pass the pulse applied to the No. 1 input terminal of this switch. The other transfer switches are ineffective in the present situation, since their No. 2 input terminals are not biased to permit conduction. The negative pulse output of switch 345 is coupled to the plate circuit of the tube A in the trigger 333 in such a way that the trigger 333 is turned "on." The trigger 333 is one of a series of triggers 331 to 334, inclusive, which constitute the readout counter. The action just described causes the transfer of the stored digit "2" value from the readin counter 357—358—359—360 to the readout counter 331—332—333—334.

At this point it should be mentioned that while the usual practice for turning triggers "on" and "off" is to apply input pulses to the grids thereof, the same result may, under some circumstances, be achieved by the application of input pulses to the plate circuits thereof.

At the low order 1 CDS–13A position in the cycle, a positive digit synch pulse at terminal 541 is applied to the grids of tubes 371, 372, 373 and 374. The negative pulse outputs of these tubes are effective to turn "off" any of the triggers 357 to 360 which may have been "on." In the present case this means that the trigger 359 will be turned "off," thereby cancelling the "2" value stored in the readin counter.

To read out the value stored in the readout counter, a positive gate pulse is applied to the terminal 564 (Fig. 8A) at the low order 1 CDS–11AB point in the cycle. This gate pulse is passed by the inverter 349 as a corresponding negative pulse which is applied to the B input terminal of a trigger 336. The positive gate pulse output of tube 336B is coupled to the No. 2 control grid of switch 335 and biases it above cutoff. Positive B-cell pulses at terminal 581 are applied to the No. 1 control grid of switch 335, and the resulting negative outputs of switch 335 are fed to the input terminals of the trigger 334 in the readout counter. For each B pulse entered into the readout counter, the counter is advanced a single count. As the counter goes from a 9 to a 0 value, the trigger 331 changes from an "on" condition to an "off" condition. The resulting positive gate pulse output of tube 331A is applied to the grid of the inverter 349 and also to the control grid of inverter 320. The negative pulse output of the inverter 349 turns the trigger 336 "off," which so affects the switch 335 that it will not pass any further B pulses for the duration of the current digital position.

As the counter 331—332—333—334 goes from 9 to 0, a negative output pulse from the right-hand side of the trigger 334 is applied to the left-hand input terminal of the trigger 331, thereby restoring the trigger 331 to its "off" condition. At the same time there is a tendency for the trigger 333 to be switched from its "off" to its "on" condition. This is prevented, however, by the inverter 370, which serves as a block stage.

It has been mentioned that the trigger 331, when turned "off," furnishes a positive input pulse to the inverter 320. This occurs at the digit "7" time ("7" being the 9's complement of the stored digit "2," which is being read out). The resulting negative output pulse of the inverter 320 passes through the conductor 41 (Figs. 8A and 8B) to the input terminal of an inverter 291, which is part of a negative coincidence switch comprising the inverters 290 and 291. At this time the other inverter 290 is being supplied with a negative input voltage by the trigger 292. Hence, the readout pulse continues through the inverter 291 and is applied to the No. 1 control grid of the positive coincidence switch 237. In the present instance the No. 2 control grid of the switch 237 may be assumed to have the proper bias for enabling the passage of a signal pulse through the switch 237. Thus, the pulse is transmitted through the inverter 210 and a cathode follower 184, emerging from the latter as a positive gate pulse which is applied to the terminal 460 (Fig. 8B) that is coupled to the normal recording head 26 (Fig. 1). The timing of the actions just described is such that reading out the value "2" from the readout counter results in the value "7" being recorded on the drum, this being the 9's-complement of "2."

Zeros are recorded on the drum as 9's in complemental fashion. When a zero (that is, a "9") is detected at the 9B point in a given digital position, it will start to turn "on" the trigger 394 (Fig. 8A). However, at the 9BA point a positive gate pulse is applied from the terminal 549 to an inverter 396, and the negative pulse output of the inverter 396 is applied to the plate circuit of tube 394B, as well as to the No. 2 control grid of the switch 393. This is effective to turn the trigger 394 "off" and to bias the No. 2 control grid of switch 393 below cutoff. Consequently, the switch 393 will not pass any A pulses, and the readin counter will stand at zero.

*Left shift—Figs. 8A and 8B*

A left-shift operation is initiated by a positive pulse which is applied to the terminal 467 (Fig. 8B) at the 21 CDS–13A cycle time, this pulse being originated by the program control means. Through the action of the inverter 189, this results in the application of a negative pulse to the right side of the trigger 215, turning this trigger "on." At the 0 CDS–13A cycle time, a positive timing pulse from the terminal 464 (Fig. 8B) is applied to an inverter 45, which in turn causes a negative pulse to be applied to the left side of the trigger 215, turning the latter "off." The resulting negative pulse output of tube 215B, applied to the right side of trigger 240, turns the trigger 240 "on." The positive pulse output of tube 240B biases the No. 2 control grids of switches 245 and 270 above cutoff.

The purpose of the trigger 215 is to introduce a one-digit time delay between the signal from the program control means and the actual start of the left shift operation. This one-digit delay could be dispensed with in the present instance. However, in the even that the machine is to be adapted for dealing with both positive and negative values, the delay time may be needed for a sign adjust cycle or the like.

At the 1 CDS–13A cycle point, a positive pulse at terminal 463 is transmitted through the switch 270 and is applied as a negative pulse to each of the triggers 239 and 268, turning these triggers "on." The positive pulse output from tube 239B biases the No. 2 control grid of the switch 238 above cutoff. This allows an 8BA timing pulse from the terminal 462 (Fig. 8B) to fire the switch 238. The resultant negative pulse output of tube 238 is transmitted through the inverter 210 and the cathode follower 184 to the terminal 460. This effectively manufactures a zero (actually a 9's-complement of zero) which is recorded by the normal recording head 26 (Fig. 1) in the cycle group 20 CDS position, as indicated in Fig. 6A.

Meanwhile, the trigger 268, in its "on" condition, causes the switch 237 to be so biased that the pulses coming over the line 41 from the readout counter are prevented from being recorded on the drum through the normal recording head 26. Simultaneously with this action, the trigger 268 so biases the switch 267 (Fig. 8B) that the output pulses from the readout counter coming over the line 41 are routed through the switches 290—291 and 267, thence through the inverter 211 and the cathode follower 185 to the terminal 461, which is coupled to the left-shift recording head 27 (Figs. 1 and 6A). From this point on, for the duration of the cycle group, all digits which are read out from the readout counter will be recorded through the left-shift recording head 27. To prevent any additional manufactured zeros from being recorded, a digit synch pulse is fed from the terminal 591 through the inverter 186 to the trigger 239, turning this trigger "off" and thereby closing the gate on the No. 2 control grid of the switch 238.

At the cycle group two 21 CDS–13A time, a positive pulse at terminal 507 is transmitted as a negative pulse by the inverter 187 and switches the trigger 268 to its "off" condition. This reverses the bias voltages of the No. 2 control grids of the switches 237 and 267, restoring these switches to a condition in which recording can take place again through the normal recording head. If additional left shifts are to take place, the triggers 239 and 268 will be turned "on" again just before each shift is to occur. In the present instance, however, it is assumed that only one shift is being performed; therefore, the triggers 239 and 268 remain "off."

If several consecutive shift operations are to be performed, it will be found convenient to employ a shift counter 46 (Fig. 8B) which registers a count each time the values in a cycle group are shifted. The details of the shift counter 46 are not illustrated herein, but a number of counters are available for performing this function. Counters of the type shown in Fig. 8A, for example, could be adapted for the purpose of registering a shift count. At each 20 CDS–13A cycle time, a pulse is supplied to the terminal 528 (Fig. 8B), causing a positive potential to be impressed upon the No. 1 control grid of the switch 245. The trigger 240 remains "on" so long as the left-shift operation is in progress, thereby maintaining the No. 2 control grid of switch 245 biased above cutoff. Hence, each time a pulse is impressed upon the terminal 528, a corresponding pulse is delivered by the switch 245 to the shift pulse counter 46.

The initial setting of the shift pulse counter 46 is determined by the number of shifts to be performed. For example, if the counter 46 has a capacity of "10," and only one shift is to be performed, the counter 46 is set up with the initial value of "9" therein, so that the first shift pulse which is generated as an incident to the first shift operation, advances the counter 46 to "10." If three shifts are to be effected, the counter 46 is initially set to the value "7," whereby three shift pulses are required for advancing the counter to its maximum value. When the requisite number of shift pulses has been counted, the counter 46 generates a gate pulse which signifies the end of the count, and this gate pulse is applied to the No. 2 control grid of the switch 192 (Fig. 8B).

The 21 CDS pulse at terminal 507 is effective, through the switch 192 (which now is biased above cutoff), to turn the trigger 240 "off." As the trigger is turned "off," the tube A therein generates a positive pulse which signifies the end of the operation. This pulse may be utilized for advancing the program control means to the next program step, or for effecting some other desired control function. At the same time, the positive bias is removed from the No. 2 control grid of the switch 245, preventing any further shift pulses from being entered into the counter 46.

*Right shift—Figs. 8A and 8B*

A right-shift operation is initiated by a positive pulse supplied at 21 CDS–13A time by the program control means to the terminal 466 (Fig. 8B). This is transmitted through the inverter 188 as a negative starting pulse to the trigger 216, turning this trigger "on." At 0 CDS–13A time, a pulse from the terminal 464 is applied through the inverter 45 to the trigger 216, turning this trigger "off." The negative pulse output from tube 216B turns the trigger 243 "on." The positive pulse output from tube 243B biases the No. 2 control grid of switch 244 above cutoff. This enables a pulse from terminal 464 to pass through switch 244 and turn the trigger 217 "on."

The purpose of the trigger 216 is to introduce a one-digit time delay between the signal from the program control means and the actual start of the left-shift operation. This one-digit delay allows time for a sign adjust cycle or the like in the event that the machine is to deal with both positive and negative values.

As mentioned above, a right-shift operation involves reading values from the drum through the right-shift reading head (Fig. 1). When the trigger 217 is turned "on," it so biases the No. 2 control grids of the switches 220 and 221 that pulses will pass from the right-shift reading terminal 472 to the conductor 40 (Figs. 8B and 8A), and pulses from the normal reading terminal 470 will be blocked. Thus, referring to Fig. 7A, the digital value of "1" from the low order 1 digital position will be read by the right-shift head 25, while the digital value 2 in the low order digital position will be omitted from the reading. The "0" value which was read from the cycle group one 21 digital position will be read out from the readout counter and recorded through the normal record terminal 460 (Fig. 8B) and the normal recording head 26 (Figs. 1 and 7A) in the 21 digital position of cycle group 2.

Throughout the remainder of cycle group 1 values are transferred from the right-shift reading head 25 to the normal recording head 26 in the manner explained hereinabove in connection with Figs. 7A, 7B and 7C. When the drum attains the position shown in Fig. 7C, at the cycle group 2–20 CDS–14A time, a positive pulse at terminal 528 (Fig. 8B) is transmitted through an inverter 47 and is applied as a negative pulse to the left side of trigger 217, turning this trigger "off." This removes the positive gate pulse from the No. 2 control grid of the switch 221, terminating the operation of the right-shift reading head. If additional right-shift operations are to be performed, the trigger 217 may be turned "on" repeatedly until all of the requisite right shifts are performed. However, in the present example it is assumed that only one right shift is to be performed. Hence, the positive pulse output of tube 217A, applied through the inverter 219 to the shift pulse counter 46, results in a pulse from the counter 46 signifying the end of the count. The consequences of this action will be explained presently.

Referring again to Fig. 7C, it will be recalled that at 20 CDS time a zero must be manufactured and recorded in the high order "9" digital position of cycle group 2 whenever a right shift is performed in going from cycle group 1 to cycle group 2. As the trigger 217 (Fig. 8B) is turned "off," the positive pulse output from tube 217A is applied through inverter 294 to the trigger 292, turning the latter trigger "on." The positive pulse output of tube 292B is applied to the grid of the inverter 290 (which is a part of the negative coincidence switch 290—291), so that the inverter 290 becomes conductive. This is effective to block the output pulses from the readout counter which are coming over the line 41.

As a further incident to turning the trigger 217 "on," the positive pulse output of tube 217A is inverted by the inverter 218 and applied as a negative pulse to the plate of the tube A in the trigger 213. This has the effect of turning the trigger 213 "on." The positive pulse output of tube 213B biases the No. 2 control grid of switch 212 above cutoff. Consequently, at the 20 CDS–8 BA time, a pulse from the terminal 462 (Fig. 8B) is passed through the switch 212, the inverter 210 and the cathode follower 184 to the normal record terminal 460 to effect the recording of "zero" (that is, the 9-complement thereof) on the drum.

The triggers 213 and 292, in the present embodiment, are permitted to remain "on" during the 20 CDS, 21 CDS and 0 CDS cycle times. Manufactured zeros therefore are recorded in the "9," "20" and "21" digital positions. At 1 CDS–13A time, a pulse from the terminal 463 passes through the inverter 95 to the triggers 213 and 292, turning these triggers "off," thereby interrupting the manufacture of zeros and restoring the recording means to its normal operation.

When the "end of count" pulse is furnished by the shift pulse counter 46 to the No. 2 control grid of the switch 192, the switch 192 is conditioned to pass a pulse at the 21 CDS–13A time from the terminal 507 to the trigger 243 for turning this trigger "off." In going "off," the trigger 243 removes the positive bias from the No. 2 control grid of the switch 244, thereby preventing the trigger 217 from being turned "on" again. Also, the trigger 243 furnishes an output pulse to the program control means signifying the end of the right-shift operation.

*Dual revolver system—Fig. 14*

In the form of the invention which has been described above, it has been assumed that the four reading and recording heads (that is, the normal and right-shift reading heads, and the normal and left-shift recording heads) are associated with a single revolver. Under some circumstances it may be desirable that a plurality of revolvers be employed. For instance, if a code employing, say, only 7 cells instead of 14 cells is utilized for representing values on the drum, the space limitations may prevent mounting a pair of heads at adjacent digital positions on the same track. In this event, resort may be had to an arrangement such as that shown schematically in Fig. 14, which comprises a pair of revolvers 50 and 51, each having its own set of spaced reading and recording heads.

The regeneration revolver 50 has a reading head 52 which is located 22 digital positions away from a recording head 53. Values recorded in the regeneration revolver 50 normally are circulated from the reading head 52 through a normal regeneration circuit 54, thence back to the recording head 53. The regeneration circuit 54, in the present instance, does not introduce any delay in the transfer of digits between reading and recording heads. Data transfer circuits such as those described hereinabove can readily be adapted to this function.

In effecting right shifts, use is made of the operation revolver 51, which has a reading head 55 located 21 digital positions from its companion recording head 56. As a first step in the right shift operation, the value stored in the regeneration revolver 50 is read out through the reading head 52 and is then routed through a right-shift transfer circuit 57 to the recording head 56 in the operation revolver. The transfer circuit 57 does not introduce any delay in the transfer of digits from the reading head 52 to the recording head 56. Readout of the digits stored in the operation revolver 51 takes place through the reading head 55 immediately following the recording of the last digit in the value by the recording head 56. Since the head 55 is located only 21 digital positions away from the head 56, whereas there are 22 digits in the original value, the extreme right-hand digit of the original value is lost.

The digits of a value may be circulated through the right-shift transfer circuit 57 and the operation revolver 51 a number of times depending upon the number of right shifts to be effected. Each time the value is read out through the reading head 55, a digit is dropped at the right end of the value.

When the value has been circulated through the right-shift transfer circuit 57 and the operation revolver 51 the required number of times, as determined by the number of right shifts to be effected, the digits pass from the reading head 55 through the normal regeneration circuit 54 to the normal recording head 53, by which the digits are recorded serially upon the regeneration revolver 50. The value which is finally recorded upon the regeneration revolver 50 will, of course, lack one or more digits of the original value in accordance with the number of right shifts effected. The first recorded digit of the final value will occupy the extreme right-hand digital position within the cycle group, and one or more manufactured zeros will be added at the left end of the final group to fill the digital positions that otherwise would be left blank by reason of the right shift process.

If a left shift is to be effected, the values read out from the normal reading head 52 are routed through a left-shift transfer circuit 59, which introduces a one-digit delay in the transfer of digits from the reading head 52 to the recording head 53. This causes the digits recorded in the next cycle group to be displaced to the left one position from the positions which they normally would occupy if they had been transferred through the normal regeneration circuit 54. In the course of the transfer, one digit is dropped, and a zero manufactured by the source 58 is inserted in the space which otherwise would be left blank because of the left shift. This process is repeated as many times as necessary to effect the required number of left shifts.

While there have been shown and described and pointed out the fundamental novel features of the invention as applied to severeal preferred embodiments thereof, it will be understood that various omissions and substitutions and changes in the form and details of the illustrated devices and in their operations may be made by those skilled in the art, without departing from the spirit of the invention. It is the intention, therefore, to be limited only as indicated by the scope of the following claims.

What is claimed is:

1. A data storage apparatus comprising a rotatable storage member having a magnetizable periphery, a first magnetic recording means cooperating with said storage member for recording a sequence of data designations in consecutive circumferential relationship on the periphery of said member as said member is rotated, a second magnetic recording means cooperating with said storage member for recording a sequence of data designations in consecutive circumferential relationship on the periphery of said member as said member is rotated, a first magnetic reading means adapted to cooperate with the periphery of said storage member and positioned in circumferenitally spaced relationship to said first magnetic recording means for reading the data designations recorded thereby, a second magnetic reading means adapted to cooperate with the periphery of said storage member and positioned in circumferentially spaced relationship to said second recording means for reading the data designations recorded thereby, the circumferential distance separating said second reading means from said second recording means being substantially less than the circumferential distance separating said first reading means from said first recording means, whereby said second reading means reads the data designations recorded by said second recording means relatively sooner than said first reading means reads the data designations recorded by said first recording means, first transfer means for transferring data designations read by said first reading means to said first recording means, second transfer means for transferring data designations read by said first reading means to said second recording means, third transfer means for transferring data designations read by said second reading means to said first recording means, and control means for rendering said first, second and third transfer means effective selectively.

2. Data storage apparatus comprising a magnetizable drum having thereon a circular recording track adapted to be magnetized selectively for storing a series of data characters, said drum being adapted to rotate continuously at a given speed for causing the characters recorded on said track to move successively past a stationary reference point, a first magnetic reading head at said reference point cooperating with said track, a second magnetic reading head cooperating with said track and located in advance of said first reading head, a first magnetic recording head cooperating with said track and located well in advance of said second reading head, a second magnetic recording head cooperating with said track and located in advance of said first recording head, means affording a normal regeneration circuit operatively interconnecting said first reading head and said first recording head whereby the reading of characters recorded in one portion of said track causes corresponding characters to be recorded in another portion of said track which is to be read, means affording a first transfer circuit operatively interconnecting said second reading head and said first recording head whereby the characters recorded upon said track are displaced in a given sense from the positions which such characters would occupy if recorded through the medium of said normal regeneration circuit, and means affording a second transfer circuit operatively interconnecting said first reading head and said second recording head whereby the characters recorded upon said track are displaced in a different sense from the positions which such characters would occupy if recorded through the medium of said normal regeneration circuit.

3. Data storage apparatus comprising a magnetizable drum having thereon a main data storage track and a supplemental data storage track each adapted to be magnetized selectively for representing a series of data characters, said main track being divided into a plurality of consecutive sections each adapted to contain a group of related data characters, a first magnetic reading head cooperating with said main track, a first magnetic recording head cooperating with said main track, a regeneration circuit normally effective to interconnect said first reading head and said first recording head, said first reading head and said first recording head being so disposed that data characters read in one section are recorded in corresponding positions within another section which is to be read when said regeneration circuit is effective, a first transfer circuit operative to interconnect said first reading head and said first recording head when a first shift operation is to be effected, said first transfer means including delay means for retarding the transfer of data from said first reading head to said first recording head, thereby shifting the positions which the recorded characters occupy relative to said corresponding positions, a second magnetic reading head cooperating with said supplemental track, a second magnetic recording head cooperating with said supplemental track, a second transfer circuit operative to interconnect said first reading head with said second recording head when a second shift operation is to be effected, said second reading head being so positioned as to read the characters recorded on said supplemental track by said second recording head, with the time interval between the recording of each character by said second recording head and the reading of such character by said second reading head being less than the time interval between the recording of each character by said first recording head and the reading of such character by said first reading head, said normal regeneration circuit also being effective to interconnect said second reading head and said first recording head, whereby characters are recorded by said first recording head in positions on said main track which are shifted relative to said corresponding positions, and control means for selectively operating said regeneration circuit and said first and second transfer circuits in accordance with the type of operation desired.

References Cited in the file of this patent

UNITED STATES PATENTS

| | | |
|---|---|---|
| 2,424,773 | Rieber | July 29, 1947 |
| 2,540,654 | Cohen et al. | Feb. 6, 1951 |
| 2,701,095 | Stibitz | Feb. 1, 1955 |

OTHER REFERENCES

"Second Progress Report, Investigations for Design of Digital Calculating Machinery at the Computation Laboratory," Harvard University, Cambridge, Mass. (work done between August 10–November 10, 1948), pages 11–5 to 11–9 relied on.